United States Patent
Kajino et al.

(10) Patent No.: US 11,034,622 B2
(45) Date of Patent: Jun. 15, 2021

(54) RARE EARTH OXYFLUORIDE SINTERED BODY AND METHOD FOR PRODUCING SAME

(71) Applicant: Mitsui Mining & Smelting Co., Ltd., Tokyo (JP)

(72) Inventors: Hitoshi Kajino, Omuta (JP); Shoji Imaura, Omuta (JP)

(73) Assignee: Mitsui Mining & Smelting Co., Ltd.

( * ) Notice: Subject to any disclaimer, the term of this patent is extended or adjusted under 35 U.S.C. 154(b) by 15 days.

(21) Appl. No.: 16/461,436

(22) PCT Filed: Nov. 9, 2017

(86) PCT No.: PCT/JP2017/040502
§ 371 (c)(1),
(2) Date: May 16, 2019

(87) PCT Pub. No.: WO2018/116688
PCT Pub. Date: Jun. 28, 2018

(65) Prior Publication Data
US 2019/0345069 A1    Nov. 14, 2019

(30) Foreign Application Priority Data
Dec. 20, 2016  (JP) .............................. JP2016-246248

(51) Int. Cl.
*C04B 35/50* (2006.01)
*C04B 35/505* (2006.01)
(Continued)

(52) U.S. Cl.
CPC ............ *C04B 35/50* (2013.01); *C04B 35/553* (2013.01); *C04B 35/645* (2013.01);
(Continued)

(58) Field of Classification Search
CPC ...... C04B 35/50; C04B 35/505; C04B 35/553
See application file for complete search history.

(56) References Cited

U.S. PATENT DOCUMENTS 9,969,652 B2 * 5/2018 Yano ..................... C04B 35/645
10,173,929 B2 * 1/2019 Fukagawa .............. C04B 35/50
(Continued)

FOREIGN PATENT DOCUMENTS

JP  2000-239067 A  9/2000
JP  2016-98143 A   5/2016
(Continued)

*Primary Examiner* — Karl E Group
(74) *Attorney, Agent, or Firm* — Harness, Dickey & Pierce, P.L.C.

(57) ABSTRACT

A sintered rare earth oxyfluoride compact is composed of $Ln_aO_bF_c$ (wherein Ln is a rare earth element; and a, b, and c each independently represent a positive number, provided that they are not equal to each other) or Ca-stabilized LnOF as a primary phase and LnOF unstabilized with Ca as a secondary phase. The intensity ratio of the XRD peak of the (018) or (110) plane of the unstabilized LnOF to the highest XRD peak of $Ln_aO_bF_c$ is preferably 0.5% to 30%.

12 Claims, 3 Drawing Sheets

(51) Int. Cl.
  *C04B 35/553* (2006.01)
  *C04B 35/645* (2006.01)
(52) U.S. Cl.
  CPC ............... *C04B 2235/3225* (2013.01); *C04B 2235/445* (2013.01); *C04B 2235/5436* (2013.01); *C04B 2235/6562* (2013.01); *C04B 2235/77* (2013.01)

(56) References Cited

U.S. PATENT DOCUMENTS

| | | | |
|---|---|---|---|
| 10,280,091 B2 * | 5/2019 | Seto | .................. C01F 11/22 |
| 2015/0096462 A1 | 4/2015 | Fukagawa et al. | |
| 2016/0326623 A1 | 11/2016 | Nagayama et al. | |
| 2017/0305796 A1 * | 10/2017 | Yano | ................... C04B 35/553 |
| 2018/0016193 A1 * | 1/2018 | Fukagawa | ......... C04B 35/63488 |
| 2018/0230022 A1 * | 8/2018 | Seto | .................. C01F 17/00 |

FOREIGN PATENT DOCUMENTS

| | | | |
|---|---|---|---|
| JP | 2016153369 A * | 8/2016 | |
| JP | 2016-211070 A | 12/2016 | |
| WO | WO-2014-002580 A1 | 1/2014 | |
| WO | WO-2016-129457 A1 | 8/2016 | |

\* cited by examiner

RARE EARTH OXYFLUORIDE SINTERED BODY AND METHOD FOR PRODUCING SAME

CROSS-REFERENCE TO RELATED APPLICATIONS

This application is a U.S. National Stage Application of International Application No. PCT/JP2017/040502, filed on Nov. 9, 2017, and claims priority to Japanese Patent Application No. 2016-246248, filed on Dec. 20, 2016. The entire disclosures of the above applications are expressly incorporated herein by reference.

BACKGROUND

Technical Field

The present invention relates to a sintered compact of a rare earth oxyfluoride and a method for producing the same.

Related Art

A fluorine-containing or chlorine-containing corrosive gas and plasma based on such a gas are used in dry etching, plasma etching, and cleaning steps in the semiconductor fabrication. Components constructing the semiconductor fabrication apparatus are susceptible to corrosion by these corrosive gases or plasma, and particles shed from the surface of the components are liable to adhere to the surface of the semiconductor and cause product defects. Therefore, ceramics having high resistance to corrosion by halogen-based plasma are used as a bulk material of the components making up the semiconductor fabrication apparatus. Among such bulk materials is an oxyfluoride of yttrium proposed in JP 2000-239067A. The yttrium oxyfluoride according to JP 2000-239067A exhibits higher resistance to corrosion by highly reactive halogen-containing corrosive gases or their plasma than conventionally used quartz and YAG.

JP 2016-98143A discloses a sintered compact of a rare earth oxyfluoride. The sintered compact consists of an yttrium oxyfluoride represented by compositional formula: YOF or $Y_5O_4F_7$. It exhibits excellent resistance to corrosion by halogen-based plasma and is useful as a material constructing a semiconductor fabrication apparatus, such as an etching chamber.

Materials constructing a semiconductor fabrication apparatus, such as an etching chamber, are required to have not only high resistance to corrosion by halogen-containing corrosive gases and their plasma as stated above but also high mechanical strength. In this regard, however, a sintered rare earth oxyfluoride compact generally has low strength and can fracture during machining or is liable to chipping on its machined surface or edges. Consequently, the sintered rare earth oxyfluoride compact has been difficult to machine with a view to increase the dimensional precision or reduce the surface roughness (mirror finishing). From these standpoints, the sintered rare earth oxyfluoride compacts disclosed in JP 2000-239067A and JP 2016-98143A have insufficient strength and still leave room for improvement.

An object of the present invention is to add improvement to a sintered compact of a rare earth oxyfluoride. That is, the object is to enhance the strength of a sintered rare earth oxyfluoride compact while retaining the anti-corrosion properties thereof.

SUMMARY

The present invention provides a sintered rare earth oxyfluoride compact composed of $Ln_aO_bF_c$ (wherein Ln is a rare earth element; and a, b, and c each independently represent a positive number, provided that they are not equal to each other) or LnOF stabilized with Ca (hereinafter "Ca-stabilized LnOF") as a primary phase and LnOF unstabilized with Ca (hereinafter "unstabilized LnOF") as a secondary phase.

The present invention also provides a method for producing the above described sintered rare earth oxyfluoride compact. The method includes mixing $Ln_2O_3$ and $LnF_3$ at a mixing ratio such that the amount of $Ln_2O_3$ is in excess of the stoichiometric ratio for forming $Ln_aO_bF_c$ (wherein Ln is a rare earth element; and a, b, and c each independently represent a positive number, provided that they are not all equal to each other) to prepare a mixed powder, forming the resulting mixed powder into a green body, and firing the green body.

The present invention also provides a method for producing the above described sintered rare earth oxyfluoride compact. The method includes mixing $Ln_2O_3$ (where Ln is a rare earth element), $LnF_3$, and $CaF_2$ to prepare a mixed powder, forming the resulting mixed powder into a green body, and firing the green body. The ratio of the $CaF_2$ in the mixed powder is 1 to 5.8 mass % relative to the total mass of $Ln_2O_3$, $LnF_3$, and $CaF_2$ being taken as 100 mass %. The ratio of $Ln_2O_3$ and $LnF_3$ in the mixed powder is consistent with the stoichiometric ratio of LnOF relative to the mass obtained by subtracting the mass of the $CaF_2$ from the total mass of $Ln_2O_3$, $LnF_3$, and $CaF_2$.

DETAILED DESCRIPTION OF THE PREFERRED EMBODIMENTS

The invention will be described on the basis of its preferred embodiments. The sintered rare earth oxyfluoride compact (hereinafter also referred simply to "the sintered compact") of the invention has a cross-sectional texture that is observed to have a primary phase and a secondary phase. The primary and secondary phases are both composed of a rare earth oxyfluoride, which is a compound composed of a rare earth element (Ln), oxygen (O), and fluorine (F). As used herein, the term "primary phase" denotes the phase having an area ratio of at least 50% in a cross-sectional texture, and the term "secondary phase" refers to the phase having an area ratio less than 50% in a cross-sectional texture. The rare earth element of the rare earth oxyfluoride composing the primary phase and that composing the secondary phase do not always need to be the same, but are preferably the same for ease of preparation.

As used herein, the term "rare earth element(Ln)" means at least one element selected from the group consisting of Sc, Y, La, Ce, Pr, Nd, Pm, Sm, Eu, Gd, Tb, Dy, Ho, Er, Yb, Tm, and Lu. Particularly preferred of these rare earth elements is yttrium (Y) for enabling better enhancement of strength while retaining the anti-corrosion properties as will be demonstrated in Examples given later.

The primary phase of the sintered compact of the invention is composed of a compound represented by compositional formula: $Ln_aO_bF_c$ (wherein Ln is a rare earth element; and a, b, and c each independently represent a positive number, provided that they are not equal) or a compound represented by compositional formula: LnOF (wherein Ln is a rare earth element) and stabilized with Ca. The $Ln_aO_bF_c$ preferably has an orthorhombic or tetragonal crystal structure. $Ln_aO_bF_c$ of which the crystal structure is identified to be orthorhombic or tetragonal in X-ray diffractometry (hereinafter abbreviated as XRD) is preferably included in the category of $Ln_aO_bF_c$. On the other hand, the Ca-stabilized LnOF has a cubic crystal structure, and Ca-stabilized LnOF of which the crystal structure is identified to be cubic is included. Both $Ln_aO_bF_c$ and Ca-stabilized LnOF are stabilized so as not to undergo phase transformation in a broad temperature range. The temperature range in which they are stable is generally 25° to 1500° C.

With respect to $Ln_aO_bF_c$ forming the primary phase according to one embodiment of the present invention, when the rare earth oxyfluoride as the primary phase is represented by compositional formula: $xLn_2O_3 \cdot yLnF_3$ (wherein x and y each independently represent a natural number of 1 or greater), the subscripts a, b, and c are numbers satisfying the relationships: a=2x+y, b=3x, and c=3y. Examples of $Ln_aO_bF_c$ include $Y_5O_4F_7$ ($4Y_2O_3 \cdot 7YF_3$) when Ln is Y; $La_{10}O_7F_{16}$ ($7La_2O_3 \cdot 16LaF_3$) when Ln is La; $Nd O_{0.67}F_{1.66}$ ($67Nd_2O_3 \cdot 166NdF_3$) when Ln is Nd; and $Eu_6O_5F_8$ ($5Eu_2O_3 \cdot 8EuF_3$) when Ln is Eu. Among these rare earth oxyfluorides, $Y_5O_4F_7$, $NdO_{0.67}F_{1.66}$, and $Eu_6O_5F_8$ preferably have an orthorhombic crystal structure, and $La_{10}O_7F_{16}$ preferably has a tetragonal crystal structure.

With respect to Ca-stabilized LnOF forming the primary phase according to another embodiment of the present invention, the phrase "LnOF stabilized with Ca (Ca-stabilized LnOF)" means that LnOF is stabilized so that (1) the cubic crystalline state thereof in the low-temperature phase (in a temperature lower than 550° C.) is more stable than that of purer LnOF and that (2) phase transformation does not occur around 550° C. (e.g., at 450° to 650° C.). For example, it is preferred for the Ca-stabilized LnOF to remain in the cubic crystal phase, showing no or as few other crystal phases as possible, even at 25° C. It is particularly preferred for the Ca-stabilized LnOF to remain in the cubic crystal phase without showing a rhombohedral crystal phase at 25° C. Stabilization of LnOF with Ca can be confirmed by, for example, the following method.

LnOF is analyzed by powder XRD using CuKα1 rays as a radiation source in a 2θ angle range of from 10° to 90° at ordinary temperature (e.g., 25° C.). While in the following description Y is chosen as Ln (rare earth element), the same procedures apply to the other rare earth elements except that the angles of detected peaks shift slightly. Whether LnOF is stabilized with Ca is judged by the presence or absence of a specific peak of a cubic crystal. The specific peak is the reflection peak from the (111) plane of cubic YOF that is observed at a 2θ angle around 28.8°. The judgement is made on the basis of whether this specific peak has a stronger intensity than any other peaks. This peak overlaps the peak from the (012) plane of rhombohedral YOF that is observed at a 2θ angle around 28.7°, and they are not separable. However, the degree of existence of the rhombohedral YOF can be estimated from the intensity of the reflection peak from the (006) plane of rhombohedral YOF observed at a 2θ angle around 28.4°. That is, it is confirmed that cubic YOF constitutes the primary phase and is stabilized with Ca when the reflection peak from the (111) plane of cubic YOF observed at a 2θ angle around 28.8° has the highest intensity and, at the same time, when the reflection peak intensity from the (006) plane of rhombohedral YOF observed at a 2θ angle around 28.4° is 15 or less relative to the highest peak intensity which is taken as 100. The peak intensity ratio as used above is obtained in terms of peak height ratio. The peak positions and peak reflection plane indices of LnOF in XRD are based on the ICDD card data.

The Ca-stabilized LnOF preferably has the form of a solid solution having Ca dissolved in LnOF. The solid solution form may be confirmed by the absence of peaks assigned to a fluoride represented by $CaF_2$ in powder XRD of a sintered compact containing LnOF using CuKα1 rays as a radiation source in a 2θ angle range of from 10° to 90°. The existence of elemental Ca can be confirmed by the absence of crystal grains observed with a high Ca concentration ($CaF_2$) on a polished surface of the sintered compact when observed by scanning electron microscopy/energy dispersive X-ray spectroscopy (SEM/EDS). As used herein, the term "crystal grain" or simply "grain" denotes the maximum unit of single crystals having the same orientation.

The Ca-stabilized LnOF preferably contains 1 to 40 moles of Ca per 100 moles of the total of the rare earth element (Ln) and Ca. With the Ca content of 1 mol or larger, phase transition from cubic or tetragonal to rhombohedral structures is inhibited more effectively, and LnOF is thus stabilized. If the number of moles of Ca is excessively large, the excess of Ca does not dissolve in LnOF but precipitates to increase the formation of the fluoride ($CaF_2$). Having a larger thermal expansion coefficient than LnOF, $CaF_2$ can cause defects of a sintered compact, such as fracture. In order to reduce the precipitation of $CaF_2$, it is preferred that the number of moles of Ca be 40 or smaller per 100 moles of the sum of the rare earth element (Ln) and Ca, thereby preventing volumetric change of LnOF during heating. To further enhance the above effect, the molar ratio of Ca is 1 to 35, more preferably 2 to 20, even more preferably 3 to 10, per 100 moles of the total of the rare earth element (Ln) and Ca. The numbers of moles of the rare earth element (Ln) and Ca in LnOF can be determined by quantitative analyses, including fluorescent X-ray spectroscopy, ICP-AES, ICP-MS, and atomic absorption spectrometry.

The foregoing description relates to the primary phase of the sintered compact of the present invention. The secondary phase of the sintered compact of the present invention is composed of unstabilized LnOF (where Ln is a rare earth element). The unstabilized LnOF has a rhombohedral crystal structure. The unstabilized LnOF is a rare earth oxyfluoride that takes a rhombohedral crystal structure at room temperature (25° C.) and a cubic or tetragonal structure at high temperatures above 600° C. The unstabilized LnOF is known to show reversible phase transition between the cubic or tetragonal phase, which is a high temperature stable phase, and the rhombohedral phase, which is a low temperature stable phase, in a temperature range of from 450° 5 to 650° C.

The sintered compact of the present invention is not particularly limited by the location of the primary and the secondary phase as long as the primary and secondary phases are observed in its cross-sectional texture. The so constituted sintered compact of the present invention exhibits increased strength while maintaining the anti-corrosion properties inherent to a rare earth oxyfluoride.

It is particularly preferred for the sintered compact of the present invention to have such a characteristic structure in which grains of the unstabilized secondary phase are present in the boundaries between the grains of the stabilized primary phase. More specifically, it is preferred that the secondary phase grains with a smaller average grain size than the primary phase grains be present in the primary phase grain boundaries in a cross-sectional texture of the sintered compact. In other words, the secondary phase is preferably precipitated in the primary phase grain boundaries, in which case the secondary phase rare earth oxyfluoride grains present in the primary phase grain boundaries have orientation disorder. The sintered compact of the present invention having such a specific texture is able to have further improved strength while retaining the anti-corrosion properties ascribed to the rare earth oxyfluoride. The above mentioned grain boundary structure, in which unstabilized secondary phase grains are present in the stabilized primary phase grain boundaries, can be confirmed by TEM electron beam diffraction.

The structure of the sintered compact of the present invention having the primary phase composed of $Ln_aO_bF_c$ or Ca-stabilized LnOF and the secondary phase composed of unstabilized LnOF can be confirmed by detecting the peaks of various crystal structures of the rare earth oxyfluoride in powder XRD of the sintered compact. While in the following description Y is chosen as Ln (rare earth element), confirmation about the other rare earth elements is provided in the same manner. Specifically, the presence of, for example, orthorhombic yttrium oxyfluoride ($Y_5O_4F_7$) in the sintered compact of the present invention is confirmed by the appearance of peaks at 2θ angles of around 28.1°, 32.3°, and 46.9° that are ascribed to the (151), (0 10 0), and (202) planes, respectively, of orthorhombic yttrium oxyfluoride in XRD in a 2θ angle range of from 10° to 170°.

On the other hand, the presence of cubic yttrium oxyfluoride (YOF) is confirmed by the presence of peaks at 2θ angles of around 28.8°, 47.9°, and 56.9° that are assigned to the (111), (220), and (311) planes, respectively, of cubic yttrium oxyfluoride (YOF) in XRD in a 2θ angle range of from 10° to 170°.

The presence of rhombohedral yttrium oxyfluoride (YOF) is confirmed by the presence of peaks at 2θ angles of around 43.1°, 43.4°, 47.4°, and 47.9° that are assigned to the (009), (107), (018), and (110) planes, respectively, of rhombohedral yttrium oxyfluoride (YOF) in XRD in a 2θ angle range of from 10° to 170°.

The XRD is conducted at room temperature, specifically 25° C. Unless otherwise noted, XRD performed in the present invention on a sintered compact sample is powder XRD. The procedures involved for XRD will be described in Examples hereinafter given.

In the embodiment where the primary phase of the sintered compact of the present invention is composed of $Ln_aO_bF_c$, it is preferred that the intensity ratio of the XRD peak of the (018) or (110) plane of the unstabilized LnOF composing the secondary phase to the highest XRD peak of $Ln_aO_bF_c$ be preferably 0.5% to 30%, more preferably 1% to 25%, even more preferably 3% to 20%. When the secondary to primary phase peak intensity ratio is in that range, the sintered compact exhibits further enhanced strength while retaining the anti-corrosion properties attributed to the rare earth oxyfluoride. In detail, with the above-defined peak intensity ratio being 0.5% or higher, sufficient improvement on strength is achieved. With the peak intensity ratio being 30% or lower, the influence of the phase transition of the secondary phase LnOF reduces, whereby the sintered compact is effectively prevented from cracking or abrupt dimensional change in high-temperature use. In this case, it suffices that at least one of the XRD peaks of the (018) and (110) planes of the secondary phase unstabilized LnOF satisfy the above described intensity ratio.

When the primary phase is $Y_5O_4F_7$, the highest peak, which is assigned to the (151) plane, is observed at 2θ=28.1°. When the primary phase is $La_{10}O_7F_{16}$, the highest peak, which is assigned to the (011) plane, appears at 2θ=26.5°. When the primary phase is $NdO_{0.67}F_{1.66}$, the highest peak, which is assigned to the (011) plane, is present at 2θ=27.1°. When the primary phase is $Eu_6O_5F_8$, the highest peak, which is assigned to the (161) plane, is observed at 2θ=27.5°.

It is technically difficult to separate the highest peak of $Ln_aO_bF_c$ and the peak assigned to the (006) plane of unstabilized LnOF in the XRD pattern because these peaks are found nearly at the same position (2θ angle). Then, the above-identified peak intensity ratio is defined to be the ratio of the intensity of either one of the (018) and (110) planes of unstabilized LnOF to the intensity of the overlapping peaks which is taken as 100.

In the foregoing description, the term "peak intensity" refers to the height of a diffraction peak observed in XRD as expressed in the unit of cps. The same meaning is applied to the term "peak intensity" as referred to in the following description.

In the case where the primary phase of the sintered compact of the present invention is Ca-stabilized LnOF, the intensity ratio of the XRD peak of the (009) or (107) plane of the secondary phase unstabilized LnOF to the XRD peak of the (111) plane of the Ca-stabilized LnOF, i.e., the highest peak, is preferably 0.5% to 10%, more preferably 1% to 9%, even more preferably 2% to 8%. When the secondary to primary phase peak intensity ratio is in that range, the sintered compact exhibits further enhanced strength while retaining the anti-corrosion properties attributed to the rare earth oxyfluoride. In detail, with the peak intensity ratio being 0.5% or higher, sufficient improvement on strength is achieved. With the peak intensity ratio being 10% or lower, the influence of the phase transition of the secondary phase LnOF reduces, whereby the sintered compact is effectively prevented from cracking or abrupt dimensional change in high-temperature use. In this case, it suffices that at least one of the XRD peaks of the (009) and (107) planes of the secondary phase unstabilized LnOF satisfy the above intensity ratio.

The peak of the (111) plane of Ca-stabilized LnOF and the peak of the (012) plane of unstabilized LnOF overlap each other in the XRD pattern because they appear nearly at the same position (2θ angle). It is technically difficult to separate them. Then, the above-identified peak intensity ratio is defined to be the ratio of the intensity of either one of the (009) and (107) planes of unstabilized LnOF to the intensity of the overlapping peaks which is taken as 100.

In order for the sintered compact of the present invention to have increased strength while retaining anti-corrosion properties, it is preferred that the primary phase grains to be larger than the secondary phase grains in a cross-sectional texture. Specifically, the primary phase grains preferably have an average grain size of 1 to 200 μm, more preferably 2 to 100 μm, even more preferably 3 to 50 μm. The secondary phase grains preferably have an average grain size of 0.1 to 5 μm, more preferably 0.2 to 4 μm, even more preferably 0.3 to 3 μm, on the condition that the average grain size of the secondary phase grains be smaller than that of the primary phase grains. The average grain sizes of the primary and the second phase are determined by the method describe in Examples hereinafter given.

The reason the sintered compact of the present invention achieves high strength, the inventors believe, is due to the locational relationship and quantitative balance between the stabilized primary phase and the unstabilized secondary phase. That is, while the primary phase does not undergo phase transformation in a broad temperature range, the secondary phase undergoes phase transformation and, consequently, shows dimensional change. The inventors consider that, owing to that balance, the crystal grains are less likely to be distorted in a broad temperature range and that, in addition to this, reduction of the grain size of the primary phase makes contribution to the achievement of high strength.

Since the secondary phase present in the sintered compact of the present invention is not stabilized, it undergoes phase transformation with temperature change. Because of the phase transformation, an inflection point is observed in dimensional change of the overall sintered compact with temperature. In contrast to this, an inflection point of dimensional change with temperature does not occur with a sintered compact composed of a single phase, e.g., of $Ln_aO_bF_c$, or of Ca-stabilized LnOF.

The inflection-point temperature (the temperature at which the inflection point of dimensional change with temperature occurs) is preferably 200° to 800° C., more preferably 250° to 700° C., even more preferably 300° to 650° C. The sintered compact which has an inflection point of dimensional change with temperature in the above temperature range exhibits high strength while retaining the anti-corrosion properties owing to the rare earth oxyfluoride. The inflection point of dimensional change with temperature can be observed by thermomechanical analysis (TMA), which will be described in Examples.

Figure 1:
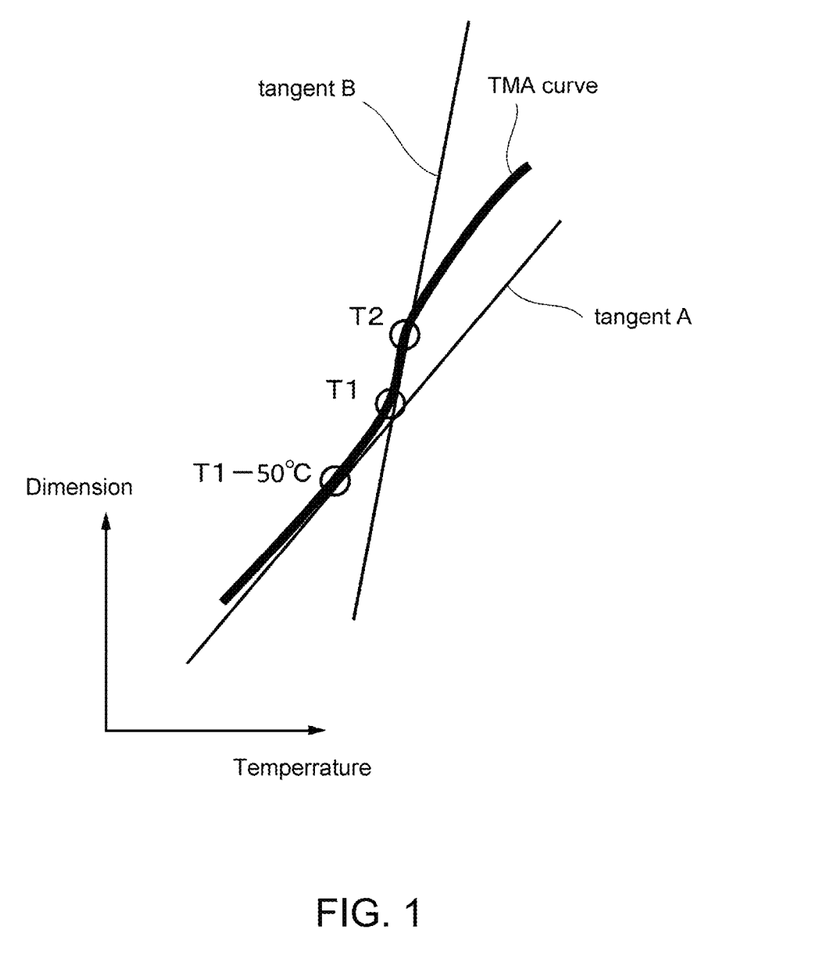
FIG. 1 is a diagram illustrating the inflection points in a graph of dimensional change vs. temperature change of a sintered compact.

Whether an inflection point appears in measurements of dimensional change versus temperature is judged, for example, as follows. Referring to FIG. 1, which exemplifies a TMA curve, two inflection points appears between 400° and 600° C. during the temperature rise. The low-temperature side inflection point being taken as T1 and the high-temperature side inflection point as T2, when tangent A of the curve at a point lower than T1 by, e.g., 50° C. and tangent B at the middle point between T1 and T2 intersect at only one point outside of the curve and have different slopes, the TMA curve is regarded as having an inflection point.

As discussed above, the sintered compact of the present invention exhibits high strength while retaining the anti-corrosion properties of the rare earth oxyfluoride. Therefore, when the sintered compact of the present invention is precision machined, for example, cut-machined, it is less likely to suffer cracking, chipping or like mechanical flaws, and it accomplishes high dimensional precision and provides products with small surface roughness easily. Specifically, the sintered compact of the present invention preferably has a three-point flexural strength of 50 to 300 MPa, more preferably 55 to 280 MPa, even more preferably 70 to 250 MPa. The three-point flexural test method will be described in Examples hereinafter given. With a three-point flexural strength of 50 MPa or higher, the sintered compact is able to be machined with high precision. From only this viewpoint, the sintered compact may have a three-point flexural strength exceeding 300 MPa. However, such a high strength could not be reached in practice unless an expensive raw material is used, or unless sintering is carried out by an underproductive technique, such as hot isostatic pressing. Consequently, the upper limit 300 MPa is considered decent from the standpoint of industrial productivity.

The sintered compact of the present invention is able to be machined to a surface roughness Ra (JIS B0601) preferably of 1 μm or less, more preferably 0.5 μm or less, even more preferably 0.1 μm or less. Machining for achieving such a small surface roughness includes, for example, polishing using a free or fixed abrasive.

Being dense unlike a thermal spray coating, the sintered compact of the present invention is able to provide high barrier properties against halogen-containing corrosive gases. A thermal spray coating is formed by building up molten particles of a thermal spray material, so that a halogen corrosive gas can enter the interstices among the molten particles. In contrast to this, the sintered compact of the present invention is so dense as to exhibit excellent barrier properties against halogen corrosive gases. When used as, for example, a member constructing a semiconductor fabrication apparatus, the sintered compact of the present invention is capable of preventing a halogen corrosive gas from entering the inside of the member to provide good protection from corrosion. Examples of members that are required to have such high barrier properties against a halogen corrosive gas include a member constructing a vacuum chamber wall, a gas inlet, a focus ring, and a wafer holder of an etching apparatus.

For the sintered compact of the present invention to be still denser, the relative density of the sintered compact is preferably 70% or higher, more preferably 80% or higher, even more preferably 90% or higher, and still even more preferably 95% or higher. A higher relative density is more desirable. A sintered compact with such a high relative density is obtained by appropriately adjusting the firing conditions for sintering, such as temperature and pressure. The relative density is determined by the Archimedes' method in accordance with JIS R1634. The details of the method will be described in Examples hereinafter given.

The sintered compact of the present invention may be made substantially solely of a rare earth oxyfluoride or may contain a component other than a rare earth oxyfluoride. That is, it may contain an inevitable impurity. Specifically, the sintered compact of the present invention has a rare earth oxyfluoride content of 98 mass % or higher. The inevitable impurity is exemplified by by-products, such as yttrium oxide, that are by-produced in the production method described below.

The rare earth oxyfluoride content of the sintered compact of the invention is preferably at least 50 mass % in view of enhancement of plasma resistance and strength. In order to further increase the enhancement effects, the rare earth oxyfluoride content of the sintered compact is more preferably 80 mass % or higher, even more preferably 90 mass % or higher, and still even more preferably 98 mass % or higher. A higher rare earth oxyfluoride content is more desirable, but the upper limit is 100 mass %.

Examples of components of the sintered compact of the present invention other than the rare earth oxyfluoride include sintering aids of various kinds, binder resins, and carbon. The sintered compact of the present invention may further contain various ceramic materials conventionally used as members constructing a semiconductor fabrication apparatus, including aluminum oxide, yttrium oxide, aluminum yttrium double oxide, yttrium fluoride, and other compounds containing a rare earth element except yttrium.

A preferred method for producing the sintered compact of the present invention will next be described with particular reference to the embodiments in which Ln (rare earth element) is Y. The similar method also applies to the other embodiments in which Ln is a rare earth element except Y.

Firstly, a preferred method for producing the sintered compact having a primary phase composed of $Y_5O_4F_7$ (hereinafter referred to as method 1) will be described. In method 1, a rare earth oxide ($Y_2O_3$) and a rare earth fluoride (YF$_3$) are used as raw materials. In the case when production of a rare earth oxyfluoride having the stoichiometric ratio of Y$_5$O$_4$F$_7$ is aimed, these raw materials are mixed at a stoichiometric ratio of Y$_2$O$_3$:YF$_3$=47:53 (by mass) and fired. Since the sintered compact to be produced in this embodiment is not a compound having the stoichiometric ratio of Y$_5$O$_4$F$_7$ but a structure composed of Y$_5$O$_4$F$_7$ as a primary phase and unstabilized YOF as a secondary phase, it is necessary to use Y$_2$O$_3$ in slight excess of the stoichiometric ratio of Y$_2$O$_3$:YF$_3$=47:53, i.e., to add YF$_3$ in an amount slightly less than the stoichiometric ratio. From this viewpoint, it is preferable to mix the raw materials, Y$_2$O$_3$ and YF$_3$, at a Y$_2$O$_3$:YF$_3$ mass ratio of 48:52 to 60:40, more preferably 49:51 to 55:45, even more preferably 50:50 to 54:46. When Y$_2$O$_3$/YF$_3$ is smaller than 48/52, the improvement on strength is insufficient. When Y$_2$O$_3$/YF$_3$ is greater than 60/40, the influence of the phase transition of the secondary phase YOF increases and, as a result, the sintered compact tends to suffer cracking or abrupt dimensional change in high-temperature use.

While in the above description Y is chosen as Ln (rare earth element), the same method also applies to the sintered compact using other rare earth elements. That is, Ln$_2$O$_3$ and LnF$_3$ are mixed using Ln$_2$O$_3$ in excess of the stoichiometric composition of Ln$_a$O$_b$F$_c$ (where Ln is a rare earth element; and a, b, and c each independently represent a positive number, provided that they are not equal to each other) to prepare a mixed powder.

In the case when the rare earth element is La, for example, La$_2$O$_3$ is added in slight excess of the stoichiometric ratio of La$_{10}$O$_7$F$_{16}$, i.e., La$_2$O$_3$:LaF$_3$=42:58. Specifically, the raw materials, La$_2$O$_3$ and LaF$_3$ are mixed preferably in an La$_2$O$_3$:LaF$_3$ mass ratio of 43:57 to 60:40.

In the case when the rare earth element is Nd, Nd$_2$O$_3$ is added in slight excess of the stoichiometric ratio of NdO$_{0.67}$F$_{1.66}$, i.e., Nd$_2$O$_3$:NdF$_3$=40:60. Preferably, the raw materials, Nd$_2$O$_3$ and NdF$_3$ are mixed in an Nd$_2$O$_3$:NdF$_3$ mass ratio of 41:59 to 60:40.

In the case when the rare earth element is Eu, Eu$_2$O$_3$ is added in slight excess of the stoichiometric ratio of Eu$_6$O$_5$F$_8$, i.e., Eu$_2$O$_3$:EuF$_3$=51:49. Preferably, the raw materials, Eu$_2$O$_3$ and EuF$_3$, are mixed in an Eu$_2$O$_3$:EuF$_3$ mass ratio of 52:48 to 60:40.

The thus prepared mixed powder is formed into a green body to be sintered by known forming techniques. Forming can be carried out by, for example, uniaxial pressing using a hydraulic press or slip casting in which a slurry (called a slip) prepared by mixing the mixed powder with a liquid medium (e.g., water), a dispersant, a binder, and so on is poured into a mold (e.g., a plaster mold). In the case of using a slip, the dispersant content and binder content are each preferably 0.1 to 3 mass % relative to the total mass of the slip.

A desired green body is obtained by either of the above forming techniques. In using a hydraulic press in pressure forming, the pressure is preferably 2 to 100 MPa.

The resulting green body is then fired to give a sintered compact. With the view of obtaining a dense sintered compact, the firing temperature is preferably 1000° to 1600° C., more preferably 1100° to 1500° C., even more preferably 1250° to 1450° C. At a firing temperature of 1000° C. or higher, the desired reaction occurs sufficiently to form the primary and the secondary phase successfully and provide sufficient denseness. At a firing temperature of 1600° C. or lower, exaggerated crystal growth is inhibited, thereby to prevent reduction in strength. The firing time is preferably 1 to 24 hours, more preferably 2 to 18 hours, even more preferably 3 to 14 hours, on the condition that the firing temperature is within the above range. By firing for 1 hour or longer, the reaction takes place sufficiently to form the primary and secondary phases successfully and provide sufficient denseness. By limiting the firing time to 24 hours, exaggerated crystal growth is inhibited thereby to prevent reduction in strength.

The firing step may be performed by hot pressing using a graphite mold. In this case, the firing temperature is as mentioned above, and the pressure is preferably 2 to 100 MPa.

With the view of obtaining a dense rare earth oxyfluoride having a desired crystal texture, the firing atmosphere is preferably vacuum. The degree of vacuum is preferably 500 Pa or lower, more preferably 200 Pa or lower, even more preferably 100 Pa or lower, in terms of absolute pressure. The desired sintered rare earth oxyfluoride compact is thus produced.

Another preferred method for producing the sintered compact of the present invention will next be described with particular reference to the embodiment in which the primary phase is Ca-stabilized LnOF, and Ln (rare earth element) is Y (hereinafter referred to as method 2). The similar method also applies to the other rare earth elements. In order to form Ca-stabilized YOF in a sintered compact by method 2, it is industrially advantageous to use as a calcium source calcium fluoride (CaF$_2$), which is inexpensive and provides stable quality. Therefore, method 2 uses, as raw materials, calcium fluoride (CaF$_2$) in addition to the rare earth oxide (Y$_2$O$_3$) and rare earth fluoride (YF$_3$) used in method 1.

The rare earth oxide, rare earth fluoride, and calcium fluoride used in method 2 are preferably used in the following ratio. The amount of calcium fluoride is preferably 1 to 5.8 mass %, more preferably 2 to 5.5 mass %, even more preferably 3 to 5.2 mass %, based on the total mass of the rare earth oxide (Y$_2$O$_3$), rare earth fluoride (YF$_3$), and calcium fluoride. The mass ratio of the rare earth oxide (Y$_2$O$_3$) and rare earth fluoride (YF$_3$) is decided so as to result in the molar ratio of YOF relative to the mass obtained by subtracting the mass of calcium fluoride from the total mass. By using 1 mass % or more of calcium fluoride, the influence of the phase transition of the secondary phase unstabilized YOF is minimized, so that cracking and abrupt dimensional change in high-temperature use are prevented effectively. By using 5.8 mass % or less of calcium fluoride, sufficient effect is obtained in improving tree-point flexural strength.

The mixed powder thus prepared is formed into a green body, which is then fired to produce a desired sintered compact. The details of the forming and firing conditions are the same as those in method 1.

The resulting sintered compact is used as a member constructing a semiconductor fabrication apparatus, such as a vacuum chamber of a dry etching apparatus and components inside the vacuum chamber, including a substrate holder, an electrostatic chuck, a focus ring, and a gas inlet. The sintered compact of the present invention is also applicable to members constructing various plasma processing systems and chemical plants as well as the members constructing a semiconductor fabrication apparatus.

EXAMPLES

The present invention will now be illustrated in greater detail, but it should be understood that the invention is not construed as being limited thereto. Unless otherwise noted, all the percentages are by mass.

Example 1

Y$_2$O$_3$ powder and YF$_3$ powder were mixed in a ratio of 49:51 by percentage to prepare a mixed powder. The mixed powder was put in a mold and formed into a green body by uniaxial pressing using a hydraulic press at a pressure of 65 MPa for 0.5 minutes. The resulting green body was fired in vacuo at 1400° C. for 4 hours to make a sintered compact.

Example 2

Y$_2$O$_3$ powder and YF$_3$ powder were mixed in a ratio of 51:49 by percentage to prepare a mixed powder. The mixed powder was mixed with water, a polycarboxylic acid dispersant, and an acrylic emulsion binder in a water, dispersant, and binder to mixed powder ratio of 20%, 1%, and 1%, respectively, relative to 10% of the mixed powder to prepare a slip. The slip was poured into a plaster mold for slip casting. The resulting green body was fired in vacuo at 1400° C. for 4 hours to obtain a sintered compact.

Example 3

Y$_2$O$_3$ powder and YF$_3$ powder were mixed in a ratio of 52:48 by percentage to prepare a mixed powder. The mixed powder was put in a graphite mold and hot pressed at a pressure of 20 MPa at 1300° C. for 1 hour to perform forming and firing simultaneously to make a sintered compact.

Example 4

A sintered compact was obtained in the same manner as in Example 1, except that Y$_2$O$_3$ powder and YF$_3$ powder were mixed in a ratio of 53:47 by percentage.

Example 5

A sintered compact was obtained in the same manner as in Example 1, except that a mixed powder was prepared by mixing Y$_2$O$_3$ powder, YF$_3$ powder, and CaF$_2$ powder in a ratio of 58:37:5 by percentage.

Example 6

A sintered compact was obtained in the same manner as in Example 1, except that a mixed powder was prepared by mixing Y$_2$O$_3$ powder, YF$_3$ powder, and CaF$_2$ powder in a ratio of 59:38:3 by percentage.

Example 7

A sintered compact was obtained in the same manner as in Example 1, except that a mixed powder was prepared by mixing La$_2$O$_3$ powder and LaF$_3$ powder in a ratio of 47:53 by percentage.

Example 8

A sintered compact was obtained in the same manner as in Example 1, except that a mixed powder was prepared by mixing Nd$_2$O$_3$ powder and NdF$_3$ powder in a ratio of 45:55 by percentage.

Example 9

A sintered compact was obtained in the same manner as in Example 1, except that a mixed powder was prepared by mixing Eu$_2$O$_3$ powder and EuF$_3$ powder in a ratio of 56:44 by percentage.

Comparative Example 1

A sintered compact was obtained in the same manner as in Example 1, except that a mixed powder was prepared by mixing Y$_2$O$_3$ powder and YF$_3$ powder in a ratio of 47:53 by percentage, which corresponds to the stoichiometric ratio for forming Y$_5$O$_4$F$_7$.

Figure 2A:
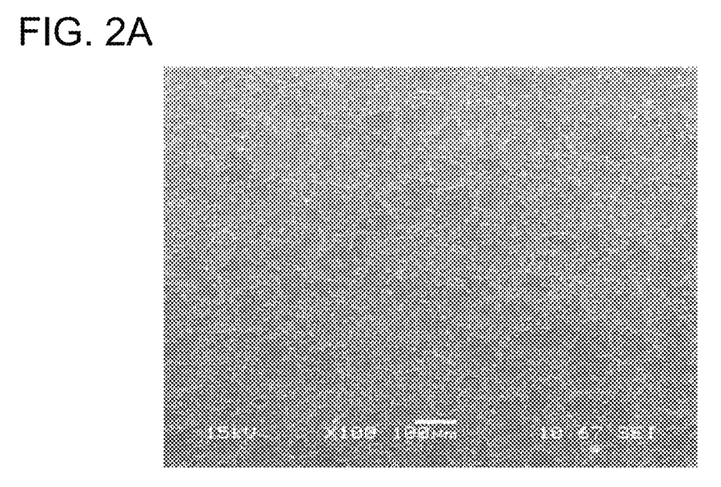
FIG. 2A and FIG. 2B are each a scanning electron micrograph of the sintered compact obtained in Example 2.
Figure 2B:
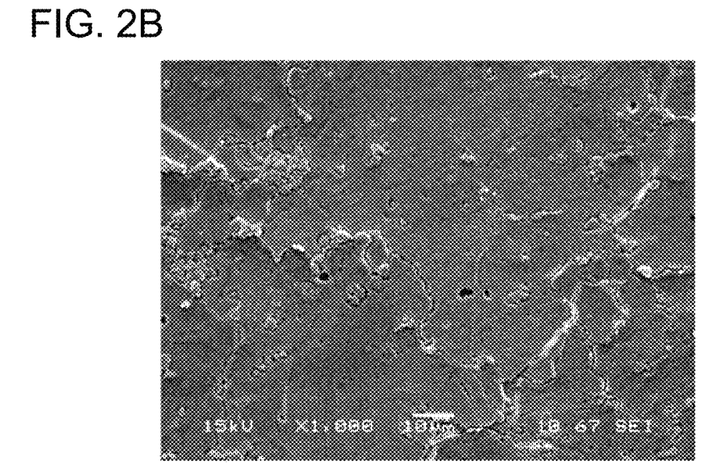
Figure 3:
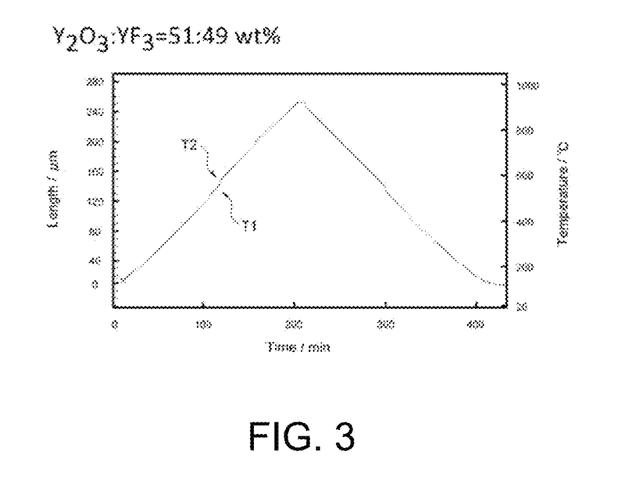
FIG. 3 is a graph of dimensional change vs. temperature change as determined in Example 2.

Evaluation:

The sintered compacts obtained in Examples and Comparative Example were analyzed by XRD to identify the primary and secondary phases and to determine peak intensity ratios in accordance with the procedures described below. The sintered compacts were also evaluated by measuring three-point flexural strength, relative density, and surface roughness. The inflection-point temperature in dimensional change with temperature was read. The average grain sizes of the primary and secondary phases were determined. The results obtained are shown in Table 1 below. A scanning electron micrograph of the sintered compact of Example 2 is shown in FIG. 2. The graph of dimensional change of the sintered compact of Example 2 as determined by TMA is shown in FIG. 3.

(1) XRD Analysis

A portion of each sintered compact was ground to powder using a mortar and pestle. The powder was analyzed by XRD using a diffractometer MiniFlex 600 from Rigaku under conditions of: target, Cu; ray source, CuKα1 rays; tube voltage, 40 kV; tube current, 15 mA; scanning speed, 20°/min; and measurement range, 2θ=3° to 90°.

With respect to Examples 1 to 4 and Comparative Example 1, a peak intensity ratio A was obtained, which is defined to be the ratio of the peak intensity of the (018) or (110) plane of unstabilized YOF (rhombohedral crystals) of the secondary phase, which was observed around 2θ=47.4° or 47.9°, respectively, to the overlapping peak intensity assigned to the (151) plane of the primary phase Y$_5$O$_4$F$_7$ and the (006) plane of the secondary phase unstabilized YOF (rhombohedral crystals), both appearing around 2θ=28.2°, being taken as 100.

With respect to Examples 5 and 6, a peak intensity ratio B was obtained, which is defined to be the ratio of the peak intensity of the (009) or (107) plane of the secondary phase unstabilized YOF (rhombohedral crystals), which was observed around 2θ=43.1° or 43.4°, respectively, to the overlapping peak intensity assigned to the (111) plane of the primary phase Ca-stabilized YOF (cubic crystals) and the (012) plane of the secondary phase unstabilized YOF (rhombohedral crystals), both appearing around 2θ=28.8°, being taken as 100.

(2) Three-Point Flexural Strength

Each sintered compact was cut, and the cut surface was polished to mirror finish to make a strip specimen measuring about 4 mm in width, about 35 mm in length, and 1.5 to 3.0 mm in thickness. The specimen was mounted on an SiC-made fixture at a span distance of 30 mm, and three-point flexural test was conducted using a universal testing machine (M 1185, from Instron) at a crosshead speed of 0.5 mm/min. The test was carried out in quintuplicate. The flexural strength $\sigma_f$ (MPa) was calculated by the following formula in accordance with JIS R1601:

$$\sigma_f = (3 \times P_f \times L)/(2 \times w \times t_2) \text{ (MPa)}$$

where $P_f$ is a load (N) at fracture; L is a span distance (mm); w is the width (mm) of the specimen; and t is the thickness (mm) of the specimen.

(3) Relative Density

The sintered compact was placed in distilled water, maintained under reduced pressure using a diaphragm pump for 1 hour, and the in-water weight $W_2$ (g) was measured. Excess water was wiped off the sample with damp cloth, and the water-saturated weight $W_3$ (g) was measured. The sample was thoroughly dried in a dryer, and the dry weight $W_1$ (g) was measured. The bulk density $\rho_b$ (g/cm$^3$) of the sintered compact was calculated by the following formula.

$$\rho_b = W_1/(W_3-W_2) \times \rho_1 (g/cm^3) \ (g/cm^3)$$

where $\rho_1$ is the density (g/cm$^3$) of distilled water. The relative density (RD) (%) was calculated from the bulk density $\rho_b$ and the theoretical density $\rho_c$ (g/cm$^3$) by the following formula.

$$RD = \rho_b/\rho_c \times 100 (\%)$$

(4) Surface Roughness

The surface of the sintered compact was polished to mirror finish using a fixed abrasive (JIS grit size: #2000). The surface roughness Ra of the mirror-finished surface was determined in accordance with JIS B0601:2013.

(5) Flexural-Point Temperature of Dimensional Change in TMA

TMA was performed in accordance with JIS R1618:2002. A differential thermogravimeter DTG-60H from Shimadzu Corp. was used. A test piece of the sintered compact was heated in the atmosphere from 25° C. up to 1000° C. at a rate of 5° C./min while the lengthwise dimension of the test piece was measured to obtain the difference from the dimension before the test. A load of 5.0 mN was applied. The temperature at which the rate of dimensional change with temperature changes on a TMA curve was read.

(6) Average Grain Size of Primary and Secondary Phase

The sintered body having been mirror-finished was maintained in an argon atmosphere at 1200° C. for 1 hour to conduct thermal etching. The thermally etched polished surface was observed under a scanning electron micrograph (SEM) and photographed at magnifications which enable measurement of the grain size of the primary and the secondary phase. The sizes of 200 grains of the primary and the secondary phase in the SEM image, each approximated by a circle of equivalent area, were measured and averaged to give an average grain size. The grains present in the boundaries of the primary phase were taken as the secondary phase.

(7) Resistance to Corrosion by Plasma (Plasma Resistance)

The sample having been evaluated for surface roughness was exposed to plasma in a fluorine-containing corrosive gas or a chlorine-containing corrosive gas for 5 hours. The amount of corrosion was estimated from the difference in weight and surface roughness between before and after the plasma exposure. Samples were rated "excellent (E)", "good (G)", or "poor (P)" in descending order of plasma resistance. The results are shown in Table 1.

TABLE 1

| | Example 1 | Example 2 | Example 3 | Example 4 | Example 5 | Example 6 | Example 7 | Example 8 | Example 9 | Comparative Example 1 |
|---|---|---|---|---|---|---|---|---|---|---|
| Raw Material Powder: | | | | | | | | | | |
| Rare Earth Element Ln | Y | Y | Y | Y | Y | Y | La | Nd | Eu | Y |
| Ln$_2$O$_3$ (mass %) | 49 | 51 | 52 | 53 | 58 | 59 | 47 | 45 | 56 | 47 |
| LnF$_3$ (mass %) | 51 | 49 | 48 | 47 | 37 | 38 | 53 | 55 | 44 | 53 |
| CaF$_2$ (mass %) | 0 | 0 | 0 | 0 | 5 | 3 | 0 | 0 | 0 | 0 |
| Sintered Compact: | | | | | | | | | | |
| Relative Density (%) | 98 | 99 | 99 | 99 | 99 | 99 | 98 | 98 | 98 | 95 |
| Primary Phase | Y$_5$O$_4$F$_7$ (O*[3]) | Y$_5$O$_4$F$_7$ (O) | Y$_5$O$_4$F$_7$ (O) | Y$_5$O$_4$F$_7$ (O) | Ca—YOF (C*[4]) | Ca—YOF (C) | La$_{10}$O$_7$F$_{16}$ (T*[5]) | NdO$_{0.67}$F$_{1.66}$ (O) | Eu$_6$O$_5$F$_8$ (O) | Y$_5$O$_4$F$_7$ (O) |
| Secondary Phase | YOF (R*[6]) | YOF (R) | YOF (R) | YOF (R) | YOF (R) | YOF (R) | LaOF (R) | NdOF (R) | EuOF (R) | none |
| Peak Intensity Ratio A*[1] (%) | 0.6 | 4.9 | 11.4 | 27.3 | — | — | 10.9 | 10.1 | 10.2 | — |
| Peak Intensity Ratio B*[2] (%) | — | — | — | — | 2.1 | 8.7 | — | — | — | — |
| Three-point Flexural Strength (MPa) | 51 | 70 | 100 | 110 | 160 | 230 | 93 | 95 | 98 | 19 |
| Surface Roughness Ra (μm) | 0.08 | 0.05 | 0.04 | 0.04 | 0.03 | 0.03 | 0.05 | 0.05 | 0.05 | 1.5 |
| Inflexion-point Temperature (° C.) in Thermal Expansion | 550 | 570 | 580 | 590 | 380 | 420 | 580 | 570 | 580 | no inflexion point |
| Average Grain Size of Primary Phase (μm) | 114 | 41 | 32 | 29 | 5 | 4 | 35 | 38 | 32 | 550 |
| Average Grain Size of Secondary Phase (μm) | 4.6 | 2.2 | 2.5 | 2.1 | 0.5 | 0.4 | 2.1 | 2.3 | 1.9 | none |
| Plasma Resistance | G | G | E | E | E | E | G | G | G | P |

*[1]Intensity ratio of the XRD peak of the (018) or (110) plane of the unstabilized LnOF to the highest peak of the primary phase.
*[2]Intensity ratio of the XRD peak of the (009) or (107) plane of the unstabilized LnOF to the highest peak of the primary phase.
*[3]O stands for orthorhombic.
*[4]C stands for cubic.
*[5]T stands for tetragonal.
*[6]R stands for rhombohedral.

As is apparent from the results in Table 1, the sintered compact obtained in every Example has a higher three-point flexural strength and higher plasma resistance than that of Comparative Example 1, which is composed solely of $Y_5O_4F_7$. With regard to plasma resistance, it could be considered that the sintered compact of Comparative Example 1 is superior to conventional common materials in plasma resistance since the crystal phase thereof is $Y_5O_4F_7$ similarly to Examples. However, the sintered compact of Comparative Example 1 suffers an increased amount of corrosion as shown in Table 1 because, the inventors believe, acceleration of corrosion and particle shedding are more likely to occur in Comparative Example 1 due to the greater surface roughness and a resultant larger contact surface area with plasma as compared with those of Examples.

INDUSTRIAL APPLICABILITY

The invention provides a sintered rare earth oxyfluoride compact that has higher strength than conventional ones while retaining good corrosion resistance enough for use as a material constructing a semiconductor fabrication apparatus, such as an etching apparatus.

The invention claimed is:

1. A sintered rare earth oxyfluoride compact comprising:
    a primary phase, and
    a secondary phase,
    wherein the primary phase includes $Ln_aO_bF_c$, where Ln is a rare earth element, and a, b, and c each independently represent a positive number that are not equal to each other, and
    wherein the secondary phase includes unstabilized LnOF.

2. The sintered rare earth oxyfluoride compact according to claim 1, wherein the intensity ratio of the XRD peak of the (018) or (110) plane of the unstabilized LnOF to the highest XRD peak of the $Ln_aO_bF_c$ is 0.5% to 30%.

3. The sintered rare earth oxyfluoride compact according to claim 2, wherein the unstabilized LnOF is present in the boundaries between the grains of the $Ln_aO_bF_c$.

4. The sintered rare earth oxyfluoride compact according to claim 1, having a three-point flexural strength of 50 to 300 MPa.

5. The sintered rare earth oxyfluoride compact according to claim 1, having a surface roughness Ra, as specified in JIS B0601, of 1 μm or smaller.

6. The sintered rare earth oxyfluoride compact according to claim 1, having an inflection-point of dimensional change with temperature occurring at a temperature ranging from 200° to 800° C.

7. The sintered rare earth oxyfluoride compact according to claim 1, wherein the primary phase has an average grain size of 1 to 200 μm, the secondary phase has an average grain size of 0.1 to 5 μm, and the average grain size of the primary phase is larger than that of the secondary phase.

8. The sintered rare earth oxyfluoride compact according to claim 1, wherein the $Ln_aO_bF_c$ is $Y_5O_4F_7$.

9. The sintered rare earth oxyfluoride compact according to claim 1, wherein the $Ln_aO_bF_c$ is $La_{10}O_7F_{16}$.

10. The sintered rare earth oxyfluoride compact according to claim 1, wherein the $Ln_aO_bF_c$ is $NdO_{0.67}F_{1.66}$.

11. The sintered rare earth oxyfluoride compact according to claim 1, wherein the $Ln_aO_bF_c$ is $Eu_6O_5F_8$.

12. A method for producing a sintered rare earth oxyfluoride compact including:
    a primary phase, and
    a secondary phase,
    wherein the primary phase includes $Ln_aO_bF_c$, where Ln is a rare earth element, and a, b, and c each independently represent a positive number that are not equal to each other, and
    wherein the secondary phase includes unstabilized LnOF,
    the method comprising:
    mixing $Ln_2O_3$ and $LnF_3$ at a mixing ratio such that the amount of $Ln_2O_3$ is in excess of the stoichiometric ratio for forming the $Ln_aO_bF_c$ to prepare a mixed powder;
    forming the mixed powder into a green body; and
    firing the green body.

* * * * *